United States Patent Office 2,865,925
Patented Dec. 23, 1958

2,865,925

PROCESS FOR PREPARING N - (2 - HYDROXYETHYL) - N - (LOWER - ALKYL) - 9 - AMINOMETHYLANTHRACENES AND INTERMEDIATES THEREIN

Chester H. Bolen, Delmar, N. Y., assignor to Sterling Drug Inc., New York, N. Y., a corporation of Delaware No Drawing. Application March 23, 1956
Serial No. 573,352

10 Claims. (Cl. 260—307)

This invention relates to a new process for preparing anthracene derivatives and to novel compounds employed therein. In particular the invention concerns a new process for preparing N-(2-hydroxyethyl)-N-(lower-alkyl)-9-aminomethylanthracenes and to novel 3-(lower-alkyl) oxazolidines having a 9-anthryl substituent in the 2-position which are employed as intermediates in said process.

The N - (2 - hydroxyethyl)-N-(lower-alkyl)-9-aminomethylanthracenes produced by my new process are described in Hunter and Buck U. S. Patent 2,734,920, issued February 14, 1956, and are useful as antifibrillatory agents and as intermediates in preparing adrenolytic agents.

My new process comprises heating 9-anthraldehyde (I) with an N-(lower-alkyl)-2-hydroxyethylamine (II), and hydrogenolyzing the resulting 2-(9-anthryl)-3-(lower-alkyl)-oxazolidine (III) to give an N-(2-hydroxyethyl)-N-(lower-alkyl)-9-aminomethylanthracene (IV), according to the following equations:

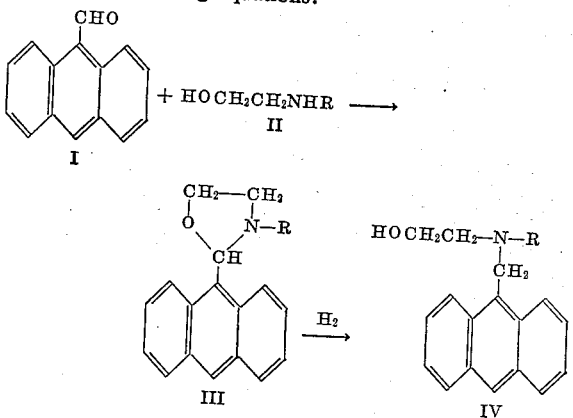

In the above formulas, R represents a lower-alkyl group which can have from one to about six carbon atoms and can be straight or branched, thus including such groups as methyl, ethyl, propyl, isopropyl, butyl, isobutyl, secondary-butyl, pentyl, isopentyl, hexyl, isohexyl, and the like.

The first step of the process comprises heating anthraldehyde with an N-(lower-alkyl)-2-hydroxyethylamine. Equimolar quantities of the aldehyde and amine, or if desired a slight excess of amine, are mixed and heated, preferably at a temperature between about 50° C. and 150° C. Since the reaction involves the elimination of a molecule of water, the process is facilitated by removing water from the reaction mixture during the heating.

If it is desired to isolate the intermediate oxazolidine, it is most conveniently obtained in the form of a crystalline acid-addition salt derived by addition of a strong acid to a solution of the free base. Any strong inorganic or organic acid can be used, although the hydrohalic acids are preferred.

The second step of the process comprises hydrogenolyzing the 2-(9-anthryl)-3-(lower-alkyl)oxazolidine produced in the first step. The reduction can be carried out on the crude aldehyde-amine reaction mixture without isolation of the oxazolidine, or can be carried out on the purified oxazolidine intermediate, either in the free base form or the acid-addition salt form. The hydrogenolysis of the oxygen-carbon bond in the 1,2-position of an oxazolidine ring occurs very readily and can be effected by a variety of different reducing agents. Any reagent providing a potential source of nascent hydrogen can be used. Exemplary of these are sodium in alcohol, aluminum amalgam, sodium amalgam, lithium aluminum hydride, and formic acid. A preferred method is the use of hydrogen itself in the presence of a catalyst such as platinum oxide, palladium, Raney nickel, copper chromite, and the like. The hydrogenolysis takes place readily under ordinary conditions of temperature and pressure, and preferably in a solvent or suspending medium, such as ethanol, benzene, ether, etc., which is inert under the conditions of the reaction. The N-(2-hydroxyethyl)-N-(lower-alkyl)-9-aminomethylanthracene is conveniently isolated in the form of a crystalline acid-addition salt obtained by addition of an excess of a strong acid to a solution of the free base.

The following examples will further illustrate the invention without limiting the same thereto.

EXAMPLE 1

*N-(2-hydroxyethyl)-N-ethyl-9-aminomethylanthracene hydrochloride*

A mixture of 20.6 g. (0.1 mole) of 9-anthraldehyde and 8.9 g. (0.1 mole) of N-ethyl-2-hydroxyethylamine was heated on a steam bath for twenty minutes. Water pump vacuum was then applied and the mixture distilled to remove water until about 5 ml. of distillate was collected. An additional 5 ml. of N-ethyl-2-hydroxyethylamine was then added and the mixture heated for thirty minutes. The reaction mixture was allowed to stand at room temperature for about fifteen hours, and was then distilled again in vacuo to remove water. To the residue containing 2-(9-anthryl)-3-ethyloxazolidine was added 300 ml. of absolute ethanol and 0.2 g. of platinum oxide catalyst. The mixture was hydrogenated at room temperature and an initial hydrogen pressure of 40 lbs. per sq. inch. After six hours reduction was complete, and the residual catalyst was removed by filtration. Excess alcoholic hydrogen chloride was added to the filtrate which upon cooling deposited 15.5 g. of 6-(2-hydroxyethyl)-N-ethyl-9-aminomethylanthracene hydrochloride, M. P. 213–214° C. Upon concentration of the mother liquors a second crop of 4.5 g., M. P. 209–210° C., was obtained. By adding ether to the remaining mother liquors a third crop of 1.2 g., M. P. 210–211° C., was obtained. The remaining mother liquor was concentrated to dryness, and the residue was dissolved in water and extracted with ether. Evaporation of the aqueous solution gave a fourth crop of 0.5 g., M. P., 209–210° C.; total yield 21.7 g. (69%).

By substitution in the preceding example of the N-ethyl-2-hydroxyethylamine by a molar equivalent amount of N-methyl-2-hydroxyethylamine, N-propyl-2-hydroxyethylamine, N-isopropyl-2-hydroxyethylamine, N-butyl-2-hydroxyethylamine, N-isobutyl-2-hydroxyethylamine, N-tertiary-butyl-2-hydroxyethylamine, N-pentyl-2-hydroxyethylamine, N-hexyl-2-hydroxyethylamine, or N-isohexyl-2-hydroxyethylamine, there can be obtained, respectively, N - (2 - hydroxyethyl) - N - methyl-9-aminomethylanthracene, N-(2-hydroxyethyl)-N-propyl-9-aminomethylanthracene, N - (2 - hydroxyethyl)-N-isopropyl-9-aminomethylanthracene, N-(2-hydroxyethyl)-N-butyl-9-aminomethylanthracene, N - (2 - hydroxyethyl) - N-isobutyl-9-aminomethylanthracene, N - (2-hydroxyethyl)-N-tertiary-butyl-9-aminomethylanthracene, N-(2-hydroxyethyl)-N-pentyl- 9-aminomethylanthracene, N-(2-hydroxyethyl)-N-hexyl-9-aminomethylanthracene, or N-(2-hydroxyethyl)-N-isohexyl-9-aminomethylanthracene.

EXAMPLE 2

2-(9-anthryl)-3-ethyloxazolidine hydrochloride

A mixture of 10.3 g. of 9-anthraldehyde and 4.5 g. of N-ethyl-2-hydroxyethylamine was heated on a steam bath under water pump vacuum for two and one-half hours. The reaction mixture containing 2-(9-anthryl)-3-ethyl-oxazolidine was then dissolved in about 60 ml. of warm isopropyl alcohol and acidified with alcoholic hydrogen chloride. The crystalline product which separated upon cooling was collected by filtration, washed with isopropyl alcohol, recrystallized from methanol and dried in vacuo, giving 2-(9-anthryl)-3-ethyloxazolidine hydrochloride in the form of yellow crystals, M. P. 208.5–211.5° C. (corr.).

*Analysis.*—Calcd. for $C_{19}H_{20}ClNO$: C, 72.80; H, 6.43; Cl, 11.30. Found: C, 73.09; H, 6.51; Cl, 11.13.

By substitution in the preceding example of the N-ethyl-2-hydroxyethylamine by a molar equivalent amount of N-methyl-2-hydroxyethylamine, N-propyl-2-hydroxy-ethylamine, N-isopropyl-2-hydroxyethylamine, N-butyl-2-hydroxyethylamine, N-isobutyl-2-hydroxyethylamine, N-tertiary-butyl-2-hydroxyethylamine, N-pentyl-2-hydroxy-ethylamine, N-hexyl-2-hydroxyethylamine, or N-isohexyl-2-hydroxyethylamine, there can be obtained, respectively, 2-(9-anthryl)-3-methyloxazolidine, 2-(9-anthryl)-3-propyloxazolidine, 2-(9-anthryl)-3-isopropyloxazolidine, 2-(9-anthryl)-3-butyloxazolidine, 2-(9-anthryl)-3-isobutyl-oxazolidine, 2-(9-anthryl)-3-tertiary-butyloxazolidine, 2-(9-anthryl)-3-pentyloxazolidine, 2-(9-anthryl)-3-hexyl-oxazolidine, or 2-(9-anthryl)-3-isohexyloxazolidine.

By substitution in the preceding example of the alcoholic hydrogen chloride by alcoholic solutions of hydrogen bromide, hydrogen iodide, sulfuric acid, phosphoric acid, or methanesulfonic acid, there can be obtained, respectively, the hydrobromide, hydriodide, sulfate (or bisulfate), phosphate (or acid phosphate), or methanesulfonate salts of 2-(9-anthryl)-3-ethyloxazolidine.

I claim:

1. The process for preparing an N-(2-hydroxyethyl)-N-(lower-alkyl)-9-aminomethylanthracene, which comprises heating 9-anthraldehyde with an N-(lower-alkyl)-2-hydroxyethylamine to produce a 2-(9-anthryl)-3-(lower-alkyl)oxazolidine, and thereafter hydrogenolyzing the latter.

2. The process for preparing a 2-(9-anthryl)-3-(lower-alkyl)oxazolidine, which comprises heating 9-anthraldehyde with an N-(lower-alkyl)-2-hydroxyethylamine.

3. The process for preparing an N-(2-hydroxyethyl)-N-lower-alkyl)-9-aminomethylanthracene, which comprises hydrogenolyzing a 2-(9-anthryl)-3-(lower-alkyl) oxazolidine.

4. The process for preparing N-(2-hydroxyethyl)-N-ethyl-9-aminomethylanthracene, which comprises heating 9-anthraldehyde with N-ethyl-2-hydroxyethylamine to produce 2-(9-anthryl)-3-ethyloxazolidine, and thereafter hydrogenolyzing the latter.

5. The process for preparing 2-(9-anthryl)-3-ethyl-oxazolidine, which comprises heating 9-anthraldehyde with N-ethyl-2-hydroxyethylamine.

6. The process for preparing N-(2-hydroxyethyl)-N-ethyl-9-aminomethylanthracene, which comprises hydrogenolyzing 2-(9-anthryl)-3-ethyloxazolidine.

7. A compound selected from the group consisting of 2-(9-anthryl)-3-lower-alkyl)oxazolidines having the formula

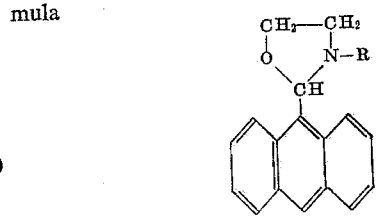

wherein R is a lower-alkyl group, and acid-addition salts thereof.

8. 2-(9-anthryl)-3-ethyloxazolidine.

9. An acid-addition salt of 2-(9-anthryl)-3-ethyloxazolidine.

10. 2-(9-anthryl)-3-ethyloxazolidine hydrochloride.

References Cited in the file of this patent

UNITED STATES PATENTS

| | | |
|---|---|---|
| 2,194,294 | Cass et al. | Mar. 19, 1940 |
| 2,194,314 | Maxwell | Mar. 19, 1940 |
| 2,734,920 | Hunter et al. | Feb. 14, 1956 |

UNITED STATES PATENT OFFICE

CERTIFICATE OF CORRECTION

Patent No. 2,865,925                                                       December 23, 1958

Chester H. Bolen

It is hereby certified that error appears in the printed specification of the above numbered patent requiring correction and that the said Letters Patent should read as corrected below.

Column 2, line 47, for "6-(2-hydroxy-" read -- N-(2-hydroxy- --; column 4, line 8, for "N-lower-alkyl)-" read -- N-(lower-alkyl)- --; line 23, for "-3-lower-alkyl)" read -- -3-(lower-alkyl) --.

Signed and sealed this 31st day of March 1959.

(SEAL)
Attest:

KARL H. AXLINE                                                           ROBERT C. WATSON
Attesting Officer                                           Commissioner of Patents